United States Patent
Erickson

[11] 3,884,446
[45] May 20, 1975

[54] LOW PROFILE CONTROL VALVE ACTUATOR

[75] Inventor: Linwood P. Erickson, Warren, R.I.

[73] Assignee: G. W. Dahl Co., Inc., Bristol, R.I.

[22] Filed: Dec. 10, 1973

[21] Appl. No.: 423,584

[52] U.S. Cl. ............................ 251/61.4; 92/98 R
[51] Int. Cl. .................................. F16k 31/12
[58] Field of Search ............ 251/58, 61, 61.1, 61.2, 251/61.3, 61.4, 61.5, 331, 367; 137/414; 92/98, 98 R, 128

[56] References Cited
UNITED STATES PATENTS

| | | | |
|---|---|---|---|
| 571,833 | 11/1896 | Hunter | 251/61.4 |
| 1,236,216 | 8/1917 | Schuler | 251/61.4 |
| 1,560,656 | 11/1925 | Brown | 251/61.4 |
| 2,564,569 | 8/1951 | Goehring | 251/61.4 |
| 2,678,662 | 5/1954 | Boteler | 251/61 |
| 2,892,608 | 6/1959 | Collins | 251/61.4 |
| 3,012,751 | 12/1961 | Hauser | 251/61 |
| 3,103,855 | 9/1963 | Hager et al. | 92/98 R |
| 3,241,805 | 3/1966 | Schumann | 251/61.4 |
| 3,321,173 | 5/1967 | Seger | 251/61.4 |
| 3,593,958 | 7/1971 | Mueller | 251/61.4 |

*Primary Examiner*—Martin P. Schwadron
*Assistant Examiner*—George L. Walton
*Attorney, Agent, or Firm*—Salter & Michaelson

[57] ABSTRACT

A control valve actuator consisting of a rectangular frame cut squarely from a rectangular steel tube. the valve is mounted adjacent the outside center of one of the longer sides of the frames. A sheet metal case is formed into a pie-plate shape and is mounted on the inner side of one of the longer sides of the frame with the flat portion of the pie-shape abutting said frame side and with the annular skirt of the pie-shape extending away from said side. A rubber diaphragm is positioned in the case and locked in by a steel ring mounted along the inner edge of the annular skirt. An adaptor is passed through a central opening in the diaphragm, and a rigid metallic disc or plate is mounted on the adaptor and locked in place to clamp the adaptor assembly to the diaphragm. An actuating rod extends from the adaptor assembly to the valve. A heavy coil spring surrounds the rod and extends from the opposite side of the frame to the disc to bias the disc and diaphragm toward the inner surface of the pie-plate case. When air under pressure is introduced to said diaphragm through vent means mounted outside the frame adjacent said case (as by an actuating signal), the diaphragm moves the disc against the spring and moves the rod to either open or close the valve. Release of the pressure allows the spring to push the disc and diaphragm back to its original non-operative position.

3 Claims, 4 Drawing Figures

PATENTED MAY 20 1975 3,884,446

LOW PROFILE CONTROL VALVE ACTUATOR

BACKGROUND OF THE INVENTION

It is conventional in the art to provide a pneumatic valve actuator wherein a signal is directed to a source of pneumatic pressure which causes the actuator to close or open a valve. One form of such a device is illustrated in U.S. Pat. No. 3,593,958, issued July 20, 1971. These devices are quite bulky and heavy, requiring a large amount of space. Furthermore, as can be seen in the above patent, they most usually embody bulky castings which require extensive machining operations. In addition, assembly, replacement of parts, and maintenance of such prior art constructions is difficult, time consuming and costly.

SUMMARY OF THE INVENTION

The present invention provides a unique construction which results in a low profile actuator generally half the height of the prior art actuators. Weight is saved by eliminating the cast housing normally utilized and providing in its stead an open frame formed by cutting from a rectangular steel tube. This open frame permits a minimum of actuating parts to be positioned for ready access and easy assembly. In addition, elimination of the castings also eliminates the costly machining operations necessarily associated therewith. The valve is mounted exteriorly of the frame. A pie-plate shaped case is mounted on the inside of the frame. A rubber diaphragm is mounted in the case and a metal plate is mounted on the diaphragm. The actuating rod extends from the plate to the valve, and a coil spring is positioned between the plate and the opposite side of the frame. Air under pressure is introduced through a vent in the frame behind the case to force the diaphragm and plate against the spring. This moves the rod to open or close the valve. Release of the air pressure allows the spring to return the parts to their normal position.

DESCRIPTION OF THE INVENTION

Figure 1:
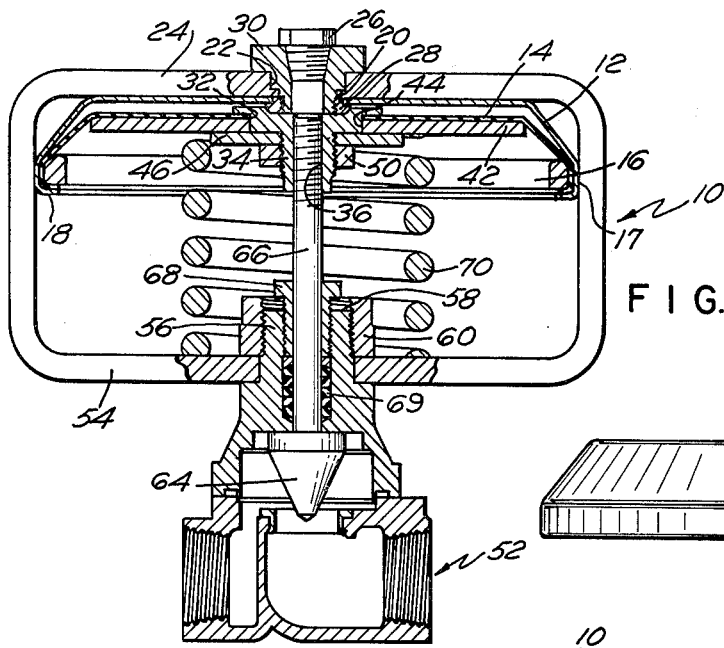
FIG. 1 is a vertical section of the valve actuator with the valve in open position.
Figure 3:
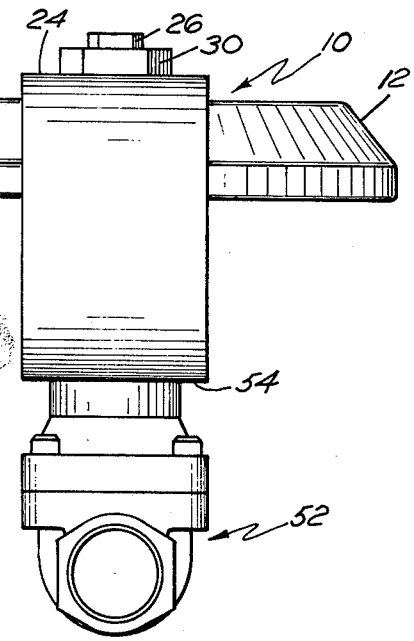
FIG. 3 is a side elevation of the device.
Figure 4:
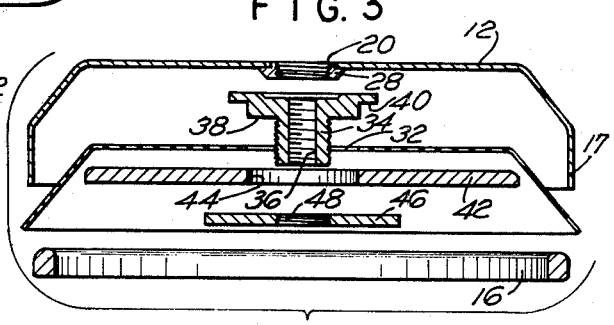
FIG. 4 is an exploded view of the actuating assembly.

One of the main features of the present invention is the base frame 10. As can be seen in FIGS. 1 and 3, the frame 10 constitutes a short length cut squarely from a piece of rectangular steel tubing of high structural strength. This provides the low profile and greatly contributes to the low-cost assembly. The valve actuator is diaphragm operated, and another important feature of my invention is the novel diaphragm construction shown in FIGS. 1 and 4. A sheet metal case 12 or housing is stamped into a pie-plate shape. The diaphragm 14 is preferably formed of a rubber sheet stock with an imbedded fabric for strength. The diaphragm 14 is placed in position in the case 12 without deforming or stretching the material. This gives the diaphragm a shape that enables it to deflect greatly to give the valve a relatively long actuating stroke.

The diaphragm is locked in position by a steel ring 16 which can also be cut from a piece of pipe. The ring 16 is inserted just below the edge of the annular skirt 17 of case 12 to pinch the edge of the diaphragm against the case. The case is then rolled over or otherwise formed at 18 to lock the ring in place and firmly lock the periphery of the diaphragm to the case 12, whereby said diaphragm and said case define a sealed chamber.

The case 12 is provided with a central opening 20 aligned with an opening 22 in one of the longer sides 24 of the frame 10. A brass fitting 26 is mounted in the opening 22, and its lower end extends through the case opening 20. A collar 28 is threaded to the outer end of the fitting 26 on the inner side of the case 12. A large integral nut 30 surrounds the fitting 26 on the outside of the frame portion 24. The fitting 26 is thus locked in the opening 22, and the case 12 is locked against the inner surface of the frame side 24 by the collar 28. The fitting 26 may be internally threaded for receiving the end of a pneumatic line connection.

The diaphragm 14 is provided with a central opening 32. An adaptor 34 is provided with a central axial threaded opening 36 and a stepped flange 38 forming a shoulder 40. When the diaphragm 14 is pushed over the adaptor 34, the opening 32 is just large enough to allow it to slide onto the shoulder 40, FIG. 1. I now provide a large plate 42 approximately equal in diameter to the bottom of the pie-plate case 12. The plate 42 has a central opening 44 equal to the diaphragm opening 32. This allows the plate to abut the diaphragm on the flange 40. This assembly is held together by a small plate 46 having a central opening 48 which engages the outer threaded surface of the adaptor 34. An additional lock nut 50 may be added to more securely lock the assembly together.

Figure 2:
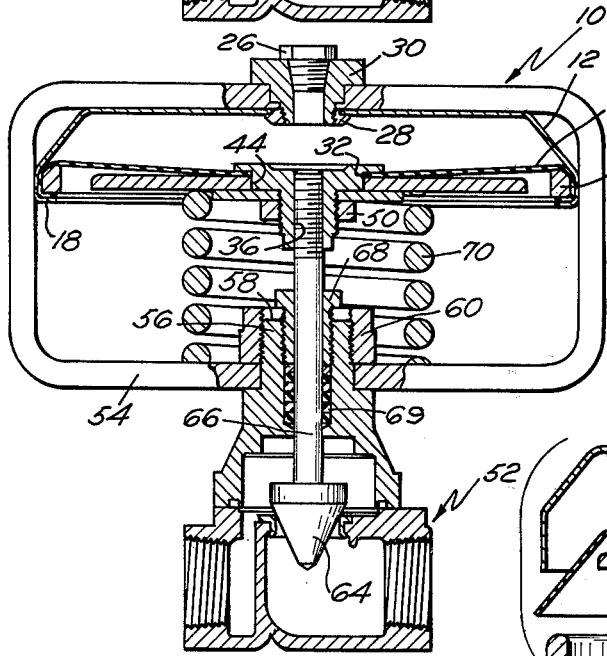
FIG. 2 is a view similar to FIG. 1 with the actuator moving the valve to closed position.

The valve 52 is mounted on the frame side 54 which is in spaced parallel relation to the side 24. The valve 52 has a shank 56 extending through an opening in the side 54. The shank 56 is externally threaded and is provided with a shoulder 58 adjacent its inner end. A large internally threaded collar 60 is threaded to the shank 56, the collar 60 thus locks the valve 52 to the frame as shown in FIGS. 1 and 2.

The valve is operated by the plug 64 mounted at one end of the actuating rod 66. The other end of the rod 66 is threaded and mounted in the adaptor opening 36. A nut 68 is internally threaded within shank 56 to compress the packing seals 69 which surround rod 66 in order to effect a pneumatic seal therewith. A large coil spring 70 is positioned with one end bearing against the plate 42 and the other end bearing against the inner surface of the side 54 of the frame 10 and extending around the collar 60, FIG. 1.

As can be seen in FIG. 1, with the above assembly the spring 70 normally biases the plate 42 and diaphragm 14 into the case 12 and against the bottom of the case. This pulls the actuating rod 66 upwardly to hold the member 64 away from its valve seat and retains the valve 52 in open position. In operation, on a predetermined signal, air under pressure is introduced through the fitting 26 to the interior of case 12. This forces the diaphragm and the central plate assembly downwardly against the action of the spring 70 into the position shown in FIG. 2. The actuating rod 66 has also been carried downwardly moving the member 64 onto the valve seat to close the valve. When the air pressure is released, the spring 70 returns the diaphragm and the associated assembly to the position shown in FIG. 1, moving the actuating rod 66 upwardly and again opening the valve 52.

As will be obvious, the same basic structural combination may be employed to achieve reverse actuation, i.e., valve 52 being normally closed, whereby introduction of air under pressure causes the valve to open. In such a reverse operation, the valve would be mounted adjacent the outer surface of side 24, and rod 66 would extend upwardly from the diaphragm rather than downwardly as shown in FIGS. 1 and 2.

The above construction provides an extremely low profile, in many sizes only one half of the height of those now in use. The prior constructions are normally mounted in large, heavy, machined castings now eliminated by the present construction. Furthermore, the assembly of such constructions is much more time consuming and costly than the present construction. This also is true of maintenance and replacement of parts. The diaphragm assembly of the present invention permits an exceptionally long actuating stroke, thus giving it a performance superior to the usual valve.

The simplicity of the assembly operation is the direct result of the low profile open frame. To assemble, the spring and diaphragm assembly is slid sideways into the frame and centered under the fitting. The fitting is tightened to lock the case to the frame and hold the diaphragm and spring in centered position. While this is being done, the large locking collar for the valve should be floating inside of the spring. The actuator is slid down over the top of the valve, and the valve stem is threaded into the cylinder which is part of the diaphragm assembly and locked in place by tightening the nut. Now the large collar is tightened over the valve shank, locking the frame to the valve body. The entire procedure is easy and simple, three nuts holding the assembly in place. Thus, if it ever becomes necessary or desirable to replace the diaphragm, disassembly of the parts can be quickly and easily effected and a new case and diaphragm assembly easily substituted.

There is thus a saving of space, weight, and assembly costs. Other advantages of the present invention will be readily apparent to a person skilled in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A valve actuator comprising a unitary, rigid steel, four-sided tubular frame of generally rectangular cross section, a valve mounted exteriorly on one side of said frame, an actuating rod connected to said valve and extending through said one frame side, said rod being axially movable to open or close said valve, a flexible diaphragm mounted within said frame in a plane substantially normal to the axis of said rod and connected thereto, housing means secured to the inside of said frame cooperating with said diaphragm to define a sealed chamber, means for introducing fluid under pressure into said chamber to flex said diaphragm and hence impart axial movement to said rod, and a coil spring mounted in said frame and normally urging said diaphragm to its non-flexed position.

2. In the valve actuator of claim 1, said housing comprising a rigid metallic case having a flat wall with an annular skirt defining a generally pie-plate, dished shape, said flat wall being secured to the inside of said frame with said skirt extending inwardly and with the plane of said flat wall being normal to the axis of said rod, and a lock ring mounted at the inner peripheral edge of said skirt securing the marginal edge of said diaphragm to the edge of said skirt in sealing relation therewith, and aligned openings in said flat wall and the frame side to which said wall is secured for permitting entry of said pressurized fluid into said chamber.

3. In the valve actuator of claim 2, a fitting extending through said aligned apertures and secured to said adjacent frame side, said flat wall being secured to said fitting so as to be maintained in abutting relation with the inner surface of said adjacent frame side, an adaptor having a central threaded opening, said adaptor being secured to the center of said diaphragm, a rigid plate secured to said adaptor and covering a substantial portion of the exposed outer surface of said diaphragm, said spring extending between said plate and the opposite side of said frame, said actuating rod being threaded into said adaptor opening.

* * * * *